United States Patent
Holcomb et al.

(10) Patent No.: US 10,362,738 B2
(45) Date of Patent: Jul. 30, 2019

(54) WORK VEHICLE

(71) Applicant: KOMATSU LTD., Tokyo (JP)

(72) Inventors: Noah Holcomb, Chattanooga, TN (US); William Schierschmidt, Chattanooga, TN (US); Gene Huleman, Chattanooga, TN (US); Nobufumi Kinoshita, Chattanooga, TN (US)

(73) Assignee: KOMATSU LTD., Tokyo (JP)

( * ) Notice: Subject to any disclaimer, the term of this patent is extended or adjusted under 35 U.S.C. 154(b) by 21 days.

(21) Appl. No.: 14/850,257

(22) Filed: Sep. 10, 2015

(65) Prior Publication Data
US 2017/0071140 A1   Mar. 16, 2017

(51) Int. Cl.
*A01G 23/081* (2006.01)

(52) U.S. Cl.
CPC .................. *A01G 23/081* (2013.01)

(58) Field of Classification Search
CPC ...... A01G 23/081; A01G 23/00; A01G 23/08; A01G 23/091; A01G 23/095; A01G 3/08; A01G 3/085; A01G 3/086; A01G 3/088; A01G 23/099; B62D 49/00; B66C 23/00; B66C 23/18; B66C 23/62; B66C 23/64; B66C 23/66; B27L 7/02; B27L 7/04; B64C 1/1407; B64C 1/1446; B64C 1/14; B64C 1/1461; B64D 29/08
USPC ..... 144/251.1, 43.1; 280/748, 850; 180/313, 180/900, 89.1, 89.11; 296/136.01, 296/100.09; 172/508; 212/223, 271; 37/43, 44, 45, 46, 47, 48, 49, 410; 104/2; 114/361; 298/23 C, 23 R
See application file for complete search history.

(56) References Cited

U.S. PATENT DOCUMENTS

| | | | | |
|---|---|---|---|---|
| 2,062,924 A * | 12/1936 | Ochsner | ................. | B65F 3/201 298/23 R |
| 2,430,973 A * | 11/1947 | Boissonnault | .......... | B65F 3/205 100/218 |
| 2,502,681 A * | 4/1950 | Swanson | ................. | E02F 3/961 172/817 |
| 2,507,630 A * | 5/1950 | Green | .................... | A45D 19/00 4/517 |
| 2,623,779 A * | 12/1952 | Catell | ...................... | B60J 7/028 160/188 |
| 2,660,816 A * | 12/1953 | Maxwell | ................... | E02F 3/30 37/403 |
| 2,665,122 A * | 1/1954 | Rowland | ................ | F15B 21/00 184/6.18 |
| 2,941,682 A * | 6/1960 | Keys | ....................... | B60P 1/483 220/830 |
| 3,249,243 A * | 5/1966 | Herpich | .................. | B65F 3/207 414/525.52 |
| 3,466,770 A * | 9/1969 | Morrison | .................. | E02F 3/30 172/823 |
| 3,556,324 A * | 1/1971 | McCarthy | ............... | B65F 3/205 414/812 |

(Continued)

*Primary Examiner* — Shelley M Self
*Assistant Examiner* — Smith Oberto Bapthelus
(74) *Attorney, Agent, or Firm* — Global IP Counselors, LLP (57) ABSTRACT

A work vehicle includes a vehicle body, a work implement, a first cover, and a second cover. The work implement is movably coupled to the vehicle body. The first cover is coupled to the work implement. The second cover is hingedly coupled to the vehicle body and is at least partially overlappingly disposed on the first cover.

20 Claims, 9 Drawing Sheets

(56) References Cited

U.S. PATENT DOCUMENTS

| | | | | | |
|---|---|---|---|---|---|
| 3,638,806 A * | 2/1972 | Hippach | B66C 23/703 | | 212/231 |
| 3,653,486 A * | 4/1972 | McLean | B65G 65/20 | | 198/508 |
| 3,727,653 A * | 4/1973 | Tucek | A01G 23/089 | | 144/34.1 |
| 3,770,062 A * | 11/1973 | Riggs | A62C 31/24 | | 169/24 |
| 3,777,917 A * | 12/1973 | Herpich | B65F 3/207 | | 414/525.52 |
| 3,799,375 A * | 3/1974 | Herpich | B65F 3/02 | | 414/525.52 |
| 3,909,962 A * | 10/1975 | Guinot | E02F 3/30 | | 37/410 |
| 3,923,276 A * | 12/1975 | Kimber | E21B 7/025 | | 173/193 |
| 3,926,263 A * | 12/1975 | Frisbee | E02F 3/80 | | 172/438 |
| 3,930,741 A * | 1/1976 | Berry | E02D 3/046 | | 404/133.2 |
| 4,030,540 A * | 6/1977 | Roma | F28F 9/0132 | | 122/510 |
| 4,089,542 A * | 5/1978 | Westerman | B60F 5/006 | | 180/208 |
| 4,100,688 A * | 7/1978 | Grist | E02D 3/026 | | 172/254 |
| T974,001 I4 * | 9/1978 | Neal | B62D 21/186 | | 137/377 |
| 4,195,698 A * | 4/1980 | Nakagawasai | E02D 7/26 | | 173/147 |
| 4,265,063 A * | 5/1981 | Muller | B66C 13/12 | | 137/377 |
| 4,267,674 A * | 5/1981 | Muller | A01G 23/08 | | 137/377 |
| 4,402,413 A * | 9/1983 | Sickler | E02F 9/18 | | 212/178 |
| 4,658,854 A * | 4/1987 | Hopkins | F16L 3/223 | | 137/355.17 |
| 4,694,930 A * | 9/1987 | Kishi | B66F 11/046 | | 182/2.11 |
| 4,832,399 A * | 5/1989 | Kosuge | B62D 21/183 | | 180/89.1 |
| 4,838,381 A * | 6/1989 | Michaud | B66F 11/044 | | 182/2.3 |
| 4,848,012 A * | 7/1989 | Zimmerman | E02F 3/30 | | 37/408 |
| 4,951,573 A * | 8/1990 | Madison | E01B 29/10 | | 104/9 |
| 5,016,767 A * | 5/1991 | Thibault | B66F 11/044 | | 182/2.9 |
| RE33,730 E * | 10/1991 | Smith | B65F 3/207 | | 100/233 |
| 5,090,546 A * | 2/1992 | McDermott | B65F 1/0093 | | 193/34 |
| 5,107,912 A * | 4/1992 | Cote | A01G 23/083 | | 144/24.13 |
| 5,318,337 A * | 6/1994 | Gotz | B60J 7/223 | | 280/756 |
| 5,462,309 A * | 10/1995 | Jeffers | E02F 9/18 | | 187/222 |
| 5,498,066 A * | 3/1996 | Cuthbertson | B60P 1/26 | | 105/377.04 |
| 5,533,284 A * | 7/1996 | Esch | E02F 9/0808 | | 37/348 |
| 5,692,689 A * | 12/1997 | Shinn | A01G 23/067 | | 144/24.12 |
| 5,715,711 A * | 2/1998 | Jennison | B60R 25/093 | | 188/32 |
| 5,727,610 A * | 3/1998 | Isley | A01G 23/083 | | 144/336 |
| 5,779,005 A * | 7/1998 | Jones, Jr. | F16C 33/664 | | 184/11.2 |
| 5,806,313 A * | 9/1998 | Koshi | E02F 3/38 | | 414/722 |
| 5,826,666 A * | 10/1998 | Tozawa | E02F 3/437 | | 172/7 |
| 5,833,298 A * | 11/1998 | Min | B60J 1/04 | | 296/96.13 |
| 5,882,058 A * | 3/1999 | Karrer | B60J 7/141 | | 280/748 |
| 5,908,060 A * | 6/1999 | Fargeot | A01G 23/083 | | 144/24.13 |
| 5,964,050 A * | 10/1999 | Svahn | E02F 3/40 | | 37/403 |
| 5,971,694 A * | 10/1999 | McNeilus | B65F 3/207 | | 100/233 |
| 5,979,518 A * | 11/1999 | Hamby | A01G 23/08 | | 144/335 |
| 5,997,060 A * | 12/1999 | Sperduto | B65F 1/1405 | | 15/104.05 |
| 6,053,560 A * | 4/2000 | Rothe | B60J 7/028 | | 296/107.16 |
| 6,105,699 A * | 8/2000 | Hinds | B62D 33/063 | | 180/89.13 |
| 6,158,949 A * | 12/2000 | Walth | E02F 3/38 | | 29/891 |
| 6,296,436 B1 * | 10/2001 | Ramun | E02F 9/18 | | 212/195 |
| 6,340,202 B1 * | 1/2002 | Stanton | B62D 31/02 | | 16/355 |
| 6,363,981 B1 * | 4/2002 | Butler | A01G 23/097 | | 144/24.13 |
| 6,425,730 B1 * | 7/2002 | Kaczmarski | E02F 3/3609 | | 37/468 |
| 6,463,725 B1 * | 10/2002 | Briesemeister | A01D 46/264 | | 56/328.1 |
| 6,485,088 B1 * | 11/2002 | Miyachi | B62D 25/10 | | 264/45.7 |
| 6,640,850 B1 * | 11/2003 | Hicks | A01G 23/091 | | 144/336 |
| 6,659,534 B2 * | 12/2003 | Willard | B60J 7/146 | | 296/107.08 |
| 6,668,880 B2 * | 12/2003 | Nordstrom | A01G 23/08 | | 144/34.1 |
| 6,763,863 B2 * | 7/2004 | Liu | A01G 23/08 | | 144/336 |
| 6,872,043 B2 * | 3/2005 | Yukawa | E02F 3/325 | | 414/694 |
| 6,913,086 B2 * | 7/2005 | Stevens | A01B 31/00 | | 172/19 |
| 6,986,368 B2 * | 1/2006 | Brown | A01G 23/091 | | 144/24.12 |
| 6,986,371 B1 * | 1/2006 | Nordstrom | A01G 23/08 | | 144/336 |
| 6,990,757 B2 * | 1/2006 | Takemura | E02F 9/0866 | | 180/89.1 |
| 7,007,730 B2 * | 3/2006 | Wildey | A01G 23/06 | | 144/336 |
| 7,008,169 B1 * | 3/2006 | Miyanishi | E02F 3/325 | | 414/685 |
| 7,082,743 B1 * | 8/2006 | Erickson | A01B 33/021 | | 56/249 |
| 7,243,690 B1 * | 7/2007 | Price | A01G 23/08 | | 144/34.1 |
| 7,427,097 B2 * | 9/2008 | Yoon | B60R 21/11 | | 180/89.12 |
| 7,481,168 B2 * | 1/2009 | Pike | E01B 27/04 | | 104/9 |
| 7,862,099 B2 * | 1/2011 | Hayashi | B60J 7/202 | | 296/107.08 |
| 7,913,725 B2 * | 3/2011 | Kot | A01G 23/081 | | 144/335 |
| 7,954,524 B2 * | 6/2011 | Voermans | A01G 23/095 | | 144/24.13 |
| 7,963,584 B2 * | 6/2011 | Odoi | B60J 1/1823 | | 296/108 |
| 8,024,875 B2 * | 9/2011 | Wetzel | E02F 3/325 | | 37/403 |

(56) References Cited

U.S. PATENT DOCUMENTS

| | | | | |
|---|---|---|---|---|
| 8,235,156 B2* | 8/2012 | Koss | E02F 9/163 | 180/311 |
| 8,292,355 B2* | 10/2012 | Miller | B60J 7/1621 | 296/190.1 |
| 8,408,862 B1* | 4/2013 | Westendorf | B66F 9/065 | 414/722 |
| 8,505,570 B2* | 8/2013 | Wimmer | E02F 9/2275 | 137/355.17 |
| 8,775,035 B2* | 7/2014 | Sherlock | E02F 3/96 | 701/50 |
| 8,821,104 B2* | 9/2014 | Yasuda | E02F 3/3405 | 248/49 |
| 8,876,163 B2* | 11/2014 | Nishiyama | B60K 15/063 | 280/830 |
| 8,960,349 B2* | 2/2015 | Sherlock | F01P 11/10 | 180/68.4 |
| 9,016,335 B2* | 4/2015 | Camps | A01G 23/081 | 144/34.1 |
| 9,119,354 B2* | 9/2015 | Stevenson | A01G 23/091 | |
| 9,121,163 B2* | 9/2015 | Ditzler | E02F 3/38 | |
| 9,151,016 B2* | 10/2015 | Sasaki | E02F 9/163 | |
| 9,169,622 B2* | 10/2015 | Sho | E02F 9/18 | |
| 9,232,701 B1* | 1/2016 | Peterson | A01G 23/083 | |
| 9,255,379 B2* | 2/2016 | Yoshimura | E02F 3/764 | |
| 9,279,228 B1* | 3/2016 | Jinnings | E02D 5/54 | |
| 9,435,105 B2* | 9/2016 | Fleischmann | A01G 23/00 | |
| 9,469,973 B2* | 10/2016 | Imaizumi | F02D 29/04 | |
| 9,476,182 B2* | 10/2016 | Nakanishi | E02F 3/7645 | |
| 9,511,655 B1* | 12/2016 | Marzocca | B60K 1/00 | |
| 9,561,711 B2* | 2/2017 | Ugolini | B60J 7/205 | |
| 9,591,810 B2* | 3/2017 | Bisballe | A01G 23/083 | |
| 2002/0182044 A1* | 12/2002 | Yu | B65F 3/00 | 414/525.1 |
| 2003/0168885 A1* | 9/2003 | Hagenbuch | B60P 1/267 | 298/23 R |
| 2005/0045245 A1* | 3/2005 | Kurelek | A01G 23/081 | 144/4.1 |
| 2005/0155837 A1* | 7/2005 | Nyquist | B65F 1/0093 | 193/34 |
| 2006/0158006 A1* | 7/2006 | Mori | E02F 9/0808 | 296/190.03 |
| 2008/0066671 A1* | 3/2008 | Donahue | B60J 7/1265 | 114/361 |
| 2009/0223093 A1* | 9/2009 | Willaredt | E02F 3/301 | 37/403 |
| 2009/0236011 A1* | 9/2009 | Bolton | B27L 7/04 | 144/366 |
| 2009/0265963 A1* | 10/2009 | Brock | E02F 3/401 | 37/444 |
| 2010/0071808 A1* | 3/2010 | Roy | A01G 23/08 | 144/34.1 |
| 2010/0200193 A1* | 8/2010 | Yabe | B60K 11/04 | 165/47 |
| 2010/0236855 A1* | 9/2010 | Matsushita | B62D 25/10 | 180/69.2 |
| 2011/0002765 A1* | 1/2011 | Asam | E02F 3/38 | 414/722 |
| 2012/0283919 A1* | 11/2012 | Kuras | B60L 11/005 | 701/50 |
| 2012/0312421 A1* | 12/2012 | Trom | A01G 23/081 | 144/4.1 |
| 2013/0115034 A1* | 5/2013 | Subrt | E02F 9/006 | 414/685 |
| 2013/0142607 A1* | 6/2013 | Ditzler | E02F 3/38 | 414/727 |
| 2014/0003901 A1* | 1/2014 | Takagi | E02F 3/30 | 414/687 |
| 2014/0069554 A1* | 3/2014 | Raszga | A01G 23/083 | 144/336 |
| 2014/0096870 A1* | 4/2014 | Kaye | A01G 23/08 | 144/335 |
| 2014/0334906 A1* | 11/2014 | Takahashi | E02F 3/38 | 414/727 |
| 2016/0040390 A1* | 2/2016 | Ozaki | E02F 9/0866 | 180/309 |
| 2016/0309666 A1* | 10/2016 | Schierschmidt | A01G 23/08 | |
| 2017/0071140 A1* | 3/2017 | Holcomb | A01G 23/081 | |

* cited by examiner

WORK VEHICLE

BACKGROUND

Field of the Invention

The present invention generally relates to a work vehicle. More specifically, the present invention relates to a work vehicle having a work implement and a cover.

Background Information

A work vehicle is a machine used in construction, mining, forestry, farming, etc. Such work vehicles typically have at least one work implement coupled to the vehicle body. The at least one work implement is often movable but can be stationary in some cases. Such work vehicles can use tracks or wheels in order to propel and/or steer, and in order to support the main body of the work vehicle.

One example of such a work vehicle is a feller buncher. A feller buncher is a type of harvester used in logging. It is a motorized vehicle with an attachment that can rapidly cut and gather one or more trees before felling them. Feller is a traditional name for someone who cuts down trees, and bunching is the skidding and assembly of two or more trees. A feller buncher performs both of these harvesting functions and includes a standard heavy equipment base with a tree-grabbing device furnished with a chain-saw, circular saw or shear designed to cut trees off at the base. The machine then places the cut tree on a stack suitable for a skidder or forwarder, or other means of transport (yarding) for further processing (e.g., delimbing, bucking, loading, or chipping). Feller bunchers are often tracked work vehicles, and can be leveling or non-leveling. The work implement of a feller buncher includes an articulating arm and/or boom and a feller head can be attached to the end of the boom. In other work vehicles, other types of work implements can be attached, such as excavator implements (bucket), bulldozer blade, or any other suitable work implements. ,

SUMMARY

It has been discovered that some work vehicles are operated at locations where debris may fall on the work vehicle. For example, a feller buncher works cutting down trees, which can result in leaves, branches and/or wood chips/sawdust falling onto the work vehicle. Other work vehicles also work where debris can fall such as construction sites, mines, farms and the forest. If a work vehicle has moving parts, such as an articulating arm or boom, the moving parts may be exposed to falling debris. With such a work vehicle, debris may fall in a coupling portion between a vehicle body and a work implement. In such a case, there is a possibility that the debris could affect the movement of the work implement.

Therefore, one object of the present invention is to provide a work vehicle, which reduces the possibility of debris falling into coupling portions between work vehicle main bodies and work implements, and thus, reduces the possibility of falling debris impacting operation of the work implement of the work vehicle.

In view of the state of the known technology and in accordance with a first aspect of the present disclosure, a work vehicle is basically provided that includes a vehicle body, a work implement, a first cover, and a second cover. The work implement is movably coupled to the vehicle body. The first cover is coupled to the work implement. The second cover is hingedly coupled to the vehicle body and is at least partially overlappingly disposed on the first cover.

Also other objects, features, aspects and advantages of the disclosed work vehicle will become apparent to those skilled in the work vehicle field from the following detailed description, which, taken in conjunction with the annexed drawings, discloses one embodiment of the work vehicle.

BRIEF DESCRIPTION OF THE DRAWINGS

Referring now to the attached drawings which form a part of this original disclosure.

DETAILED DESCRIPTION OF THE EMBODIMENT(S)

Selected embodiments of the present invention will now be explained with reference to the drawings. It will be apparent to those skilled in the work vehicle field from this disclosure that the following descriptions of the embodiments of the present invention are provided for illustration only and not for the purpose of limiting the invention as defined by the appended claims and their equivalents.

Figure 1:
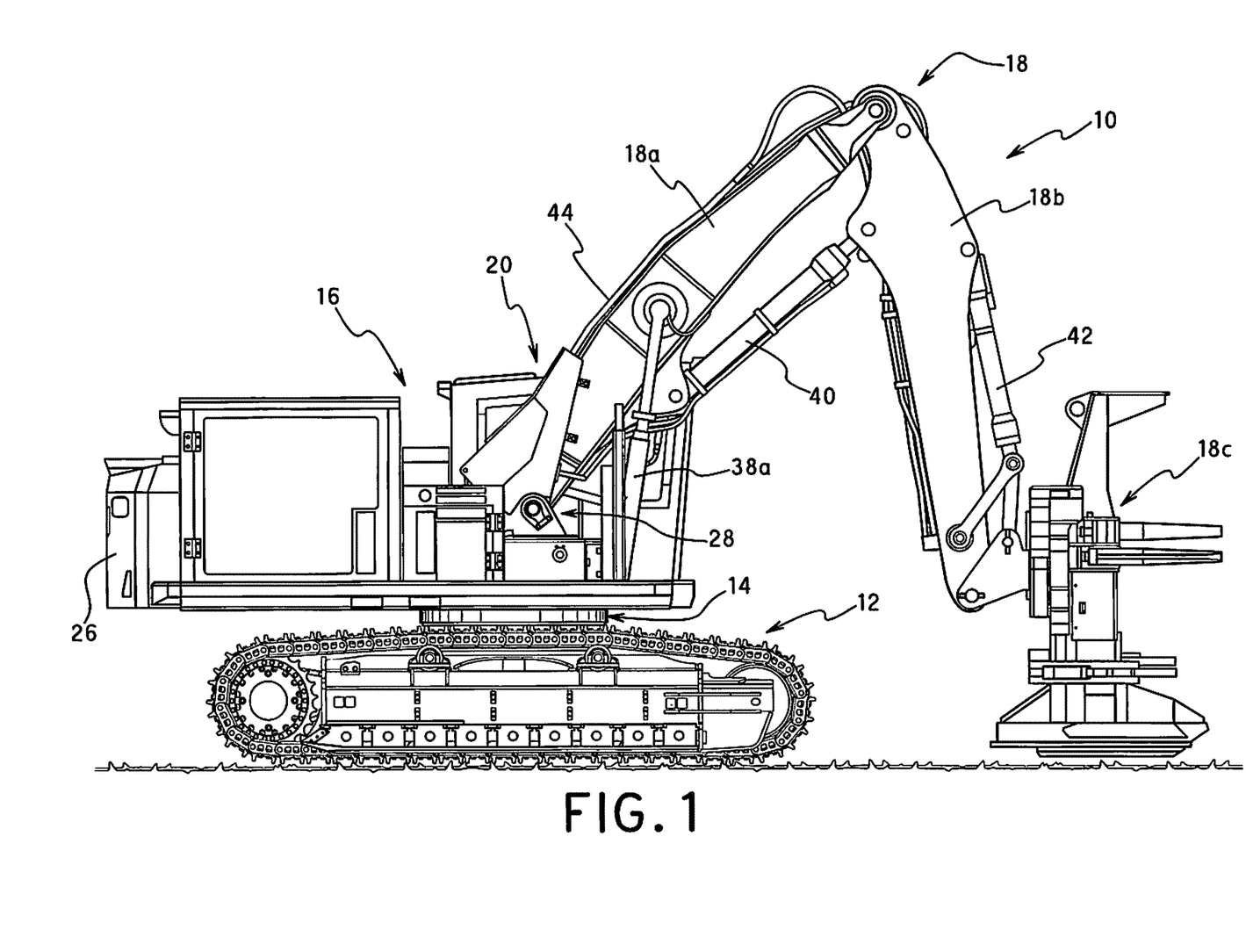
FIG. 1 is a side elevational view of a work vehicle in accordance with a first embodiment.

Referring initially to FIG. 1, a work vehicle 10 is illustrated in accordance with a first embodiment. In the illustrated embodiment, the work vehicle 10 is a tracked work vehicle that includes a traveling apparatus 12, a pivotal attachment structure 14, a vehicle body 16 and a work implement 18. In the illustrated embodiment, the traveling apparatus 12 has a pair of tracks used to propel and maneuver the work vehicle 10 in a conventional manner. Therefore, in the illustrated embodiment, the work vehicle 10 is a tracked work vehicle. The vehicle body 16 is supported by and attached to the traveling apparatus 12 via the pivotal attachment structure 14. The work implement 18 is movably attached to the vehicle body 16.

In the illustrated embodiment, the work implement 18 is a forestry implement. More specifically, in the illustrated embodiment, the work implement 18 includes a boom 18a, an arm 18b and a feller head 18c. The boom 18a has a first portion movably attached to the vehicle body 16 and a second portion attached to the arm 18b. The arm 18b has a first portion movably attached to the boom 18a and a second portion with the feller head 18c attached thereto. A pivotal connection attaches the first portion of the arm 18b to the second portion of the boom 18a in a conventional manner. Thus, the work vehicle 10 in the illustrated embodiment is a feller buncher. While the work vehicle 10 illustrated herein is particularly suited to such a forestry work vehicle due to the possibility of debris falling on such forestry work vehicles, it will be apparent to those skilled in the work vehicle field from this disclosure that the present invention is applicable to any work vehicle (e.g., harvester, log loader, shovel, etc.) in which debris may fall on the work vehicle.

In addition, while in the illustrated embodiment, the work vehicle 10 is a tracked work vehicle, it will be apparent to those skilled in the work vehicle field from this disclosure that the present invention is also applicable the wheeled work vehicles in which the traveling apparatus 12 is replaced by wheels. Furthermore, in the illustrated embodiment, the work vehicle 10 is a long tail non-leveling work vehicle. However, it will be apparent to those skilled in the work vehicle field from this disclosure that the present invention is also applicable to short tail and/or leveling work vehicles.

Figure 2:
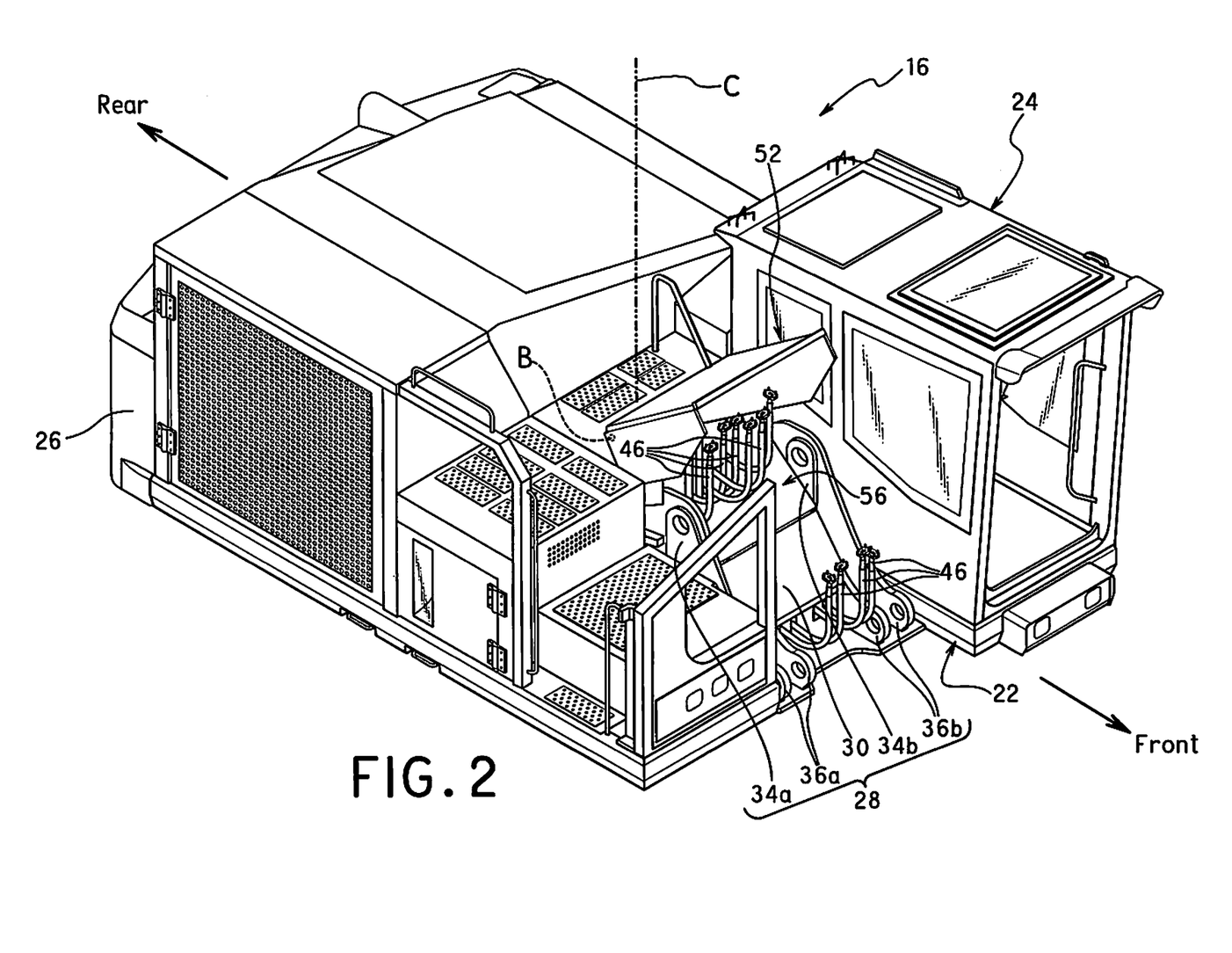
FIG. 2 is a front perspective view of the work vehicle illustrated in FIG. 1, but with the undercarriage and work implement removed for the purpose of illustration.

Referring now to FIGS. 1-2, the work vehicle 10 is conventional, except for the way the work implement 18 is coupled to the vehicle body 16 of the work vehicle 10. In particular, the work implement 18 is coupled to the vehicle body 16 using a cover structure 20 in accordance with the present invention, as explained in more detail below. The cover structure 20 guards the coupling (connection) between the work implement 18 and the vehicle body 16. More specifically, the cover structure 20 reduces the possibility of falling debris entering the coupling (connection) between the work implement 18 and the vehicle body 16, which could potentially impact operation of the work implement 18 of the work vehicle 10. The cover structure 20 in accordance with the present invention will be explained in more detail below.

The vehicle body 16 includes a support frame 22, a cab 24, a counterweight 26, a work implement attachment portion 28 and various other support elements/body panels/housings. The cab 24 is mounted on the support frame 22 at a front end thereof. The counterweight 26 is mounted on the support frame 22 at a rear end thereof. The work implement attachment portion 28 is disposed at the front end of the support frame 22. The work implement attachment portion 28 can be an integral part of the support frame 22 or can be a separate structure that is attached to the support frame 22. The counterweight 26 balances the work vehicle 10 in a front to back direction with respect to the work implement 18. A center C of the vehicle body 16 is centered between the front and rear ends of the vehicle body 16 and the lateral sides of the vehicle body 16.

Figure 3:
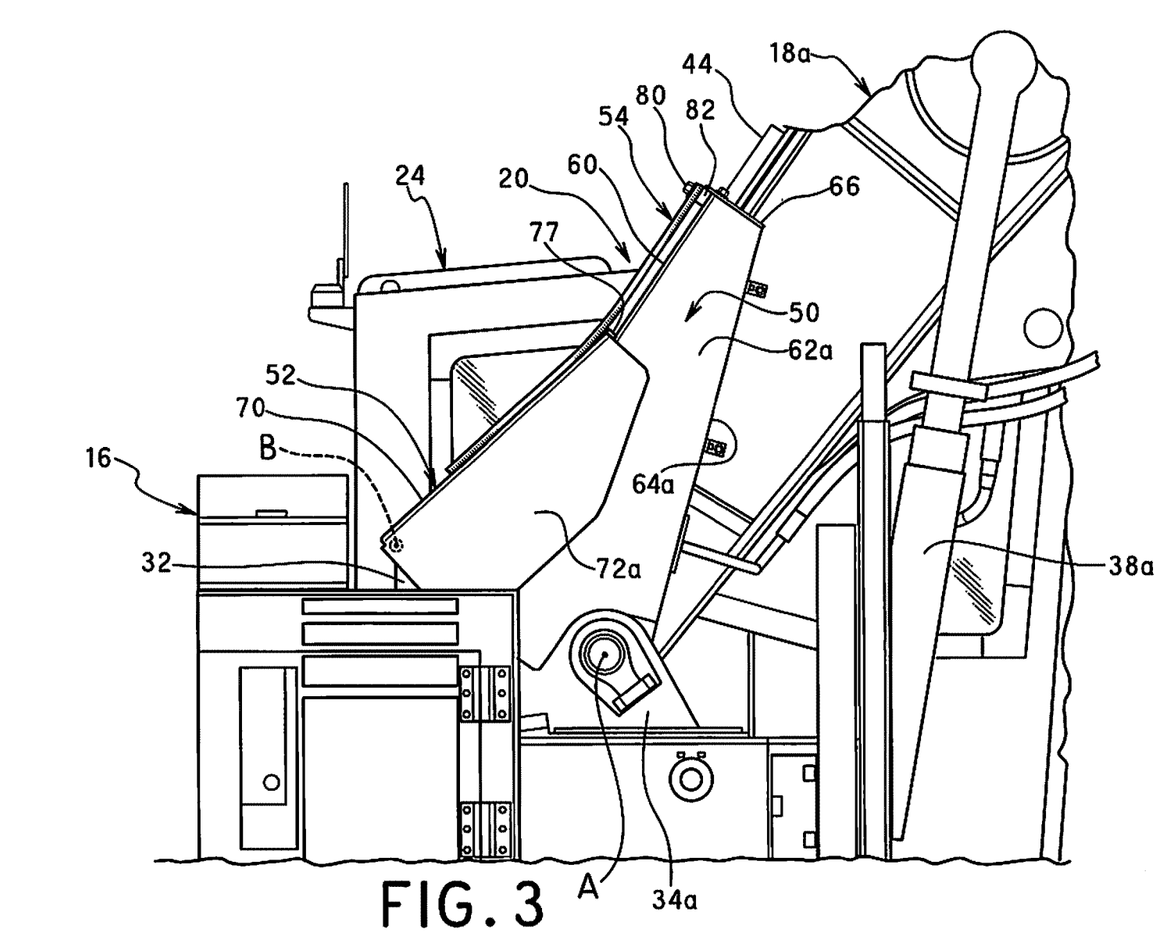
FIG. 3 is an enlarged partial side elevational view of the work vehicle illustrated in FIG. 1, with the work implement in a first position.

As best seen in FIGS. 2 and 3, the work implement attachment portion 28 includes a sloped panel 30, a cover attachment section 32, a pair of arm attachment flanges 34a and 34b, and two pairs of piston attachment flanges 36a and 36b. The sloped panel 30 is fixedly attached to the support frame 22 at the front end of the support frame 22. The cover attachment section 32 is disposed at an upper end of the sloped panel 30 and rearward of the sloped panel 30. The cover attachment section 32 has part of the cover structure 20 coupled thereto, as explained below. The cover attachment section 32 is fixedly attached to support frame 22. The pair of arm attachment flanges 34a and 34b are located at an upper end of the sloped panel 30 in front of the cover attachment section 32. The pair of arm attachment flanges 34a and 34b are non-movably fixed relative to the support frame 22. The boom 18a of the work implement 18 is pivotally attached to the pair of arm attachment flanges (vertical plates) 34a and 34b. The two pairs of piston attachment flanges 36a and 36b are located forwardly of the sloped panel 30 and downwardly from the arm attachment flanges 34a and 34b. The two pairs of piston attachment flanges 36a and 36b are non-movably fixedly relative to the support frame 22.

Figure 4:
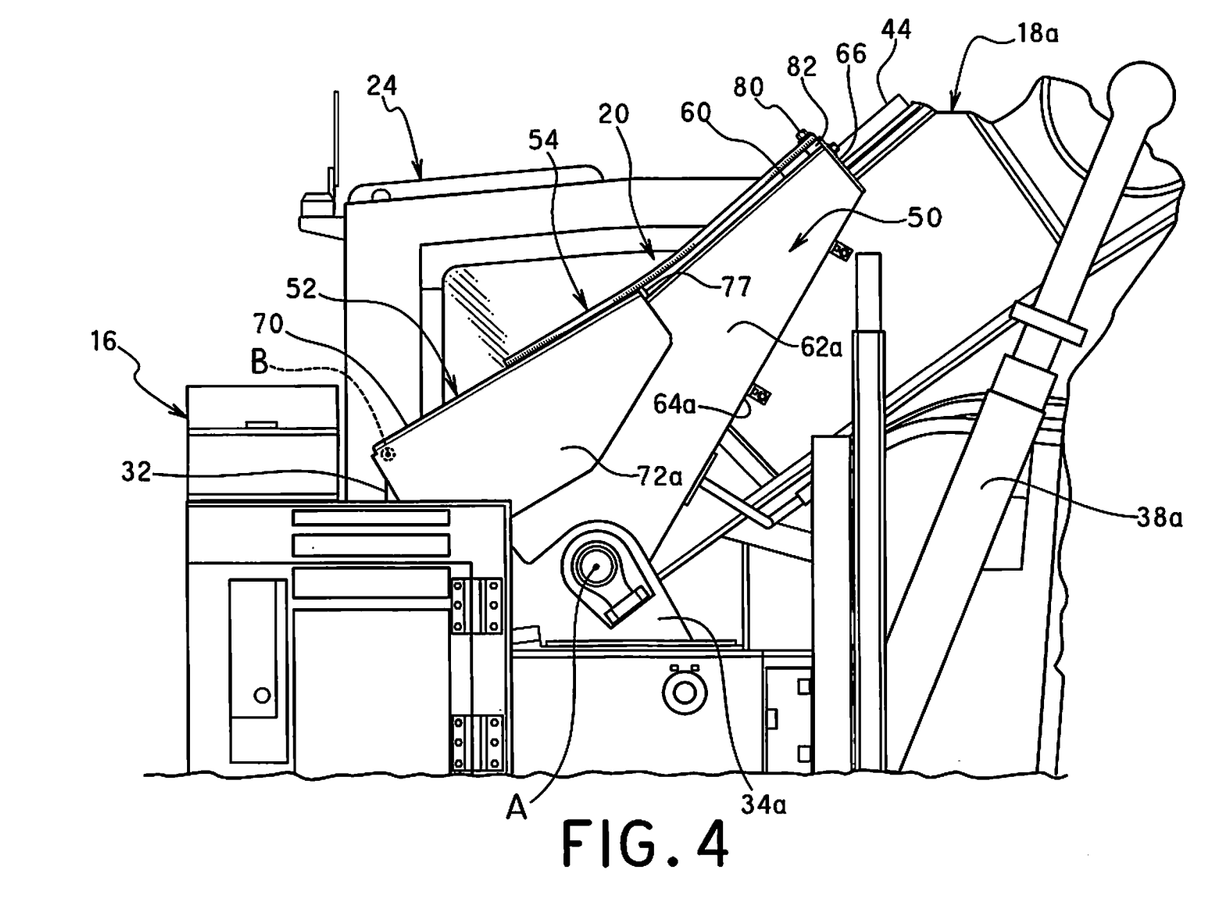
FIG. 4 is an enlarged partial side elevational view of the work vehicle illustrated in FIG. 1, with the work implement in a second position.
Figure 7:
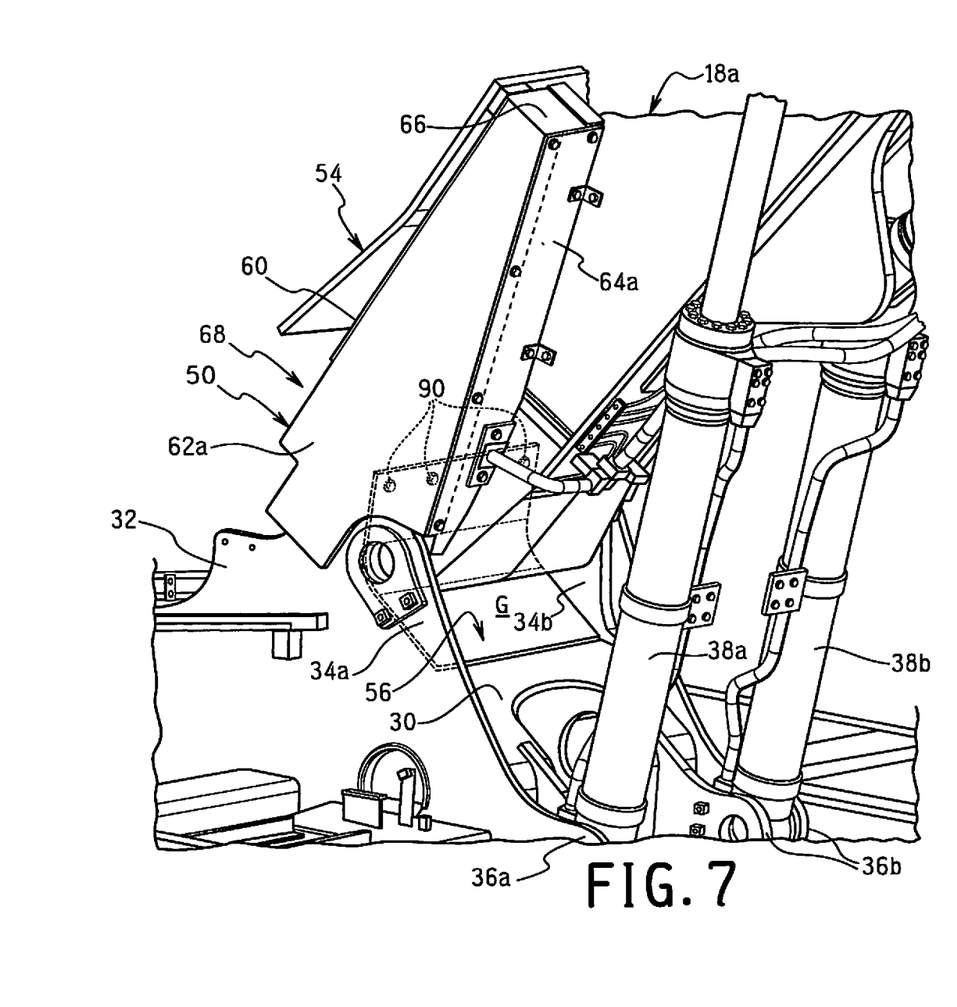
FIG. 7 is an enlarged partial left front perspective view of the work vehicle illustrated in FIG. 1, with a cover removed for the purpose of illustration.
Figure 8:
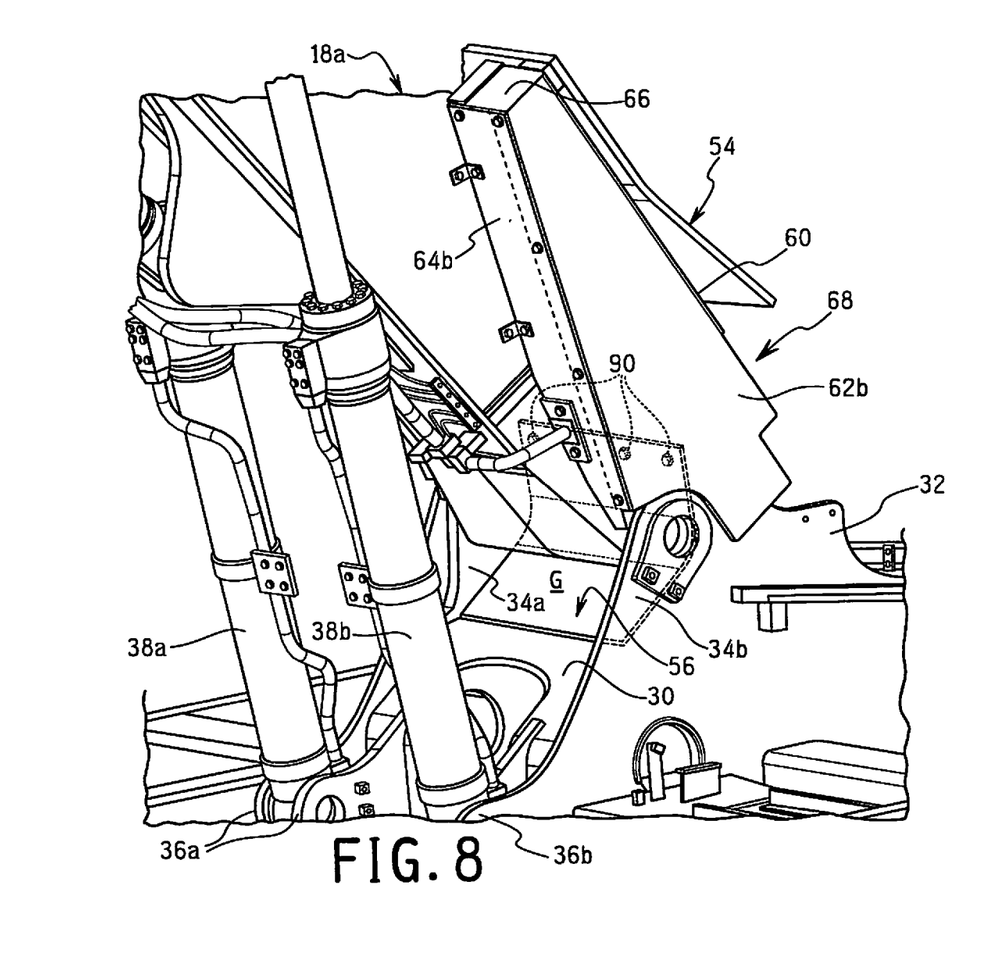
FIG. 8 is an enlarged partial right front perspective view of the work vehicle illustrated in FIG. 1, with a cover removed for the purpose of illustration.

Referring now to FIGS. 1-8, a pair of actuating pistons 38a and 38b are pivotally attached to the two pairs of piston attachment flanges 36a and 36b at lower ends of the actuating pistons 38a and 38b as best seen in FIGS. 2, 7 and 8. Upper ends of the actuating pistons 38a and 38b are pivotally coupled to the boom 18a so that hydraulic actuation of the actuating pistons 38a and 38b causes the boom 18a to pivot between the arm attachment flanges 34a and 34b about a first pivot axis A in a conventional manner as best seen in FIGS. 1, 3 and 4. An actuating piston 40 has a rear end pivotally attached to the boom 18a and a front end pivotally attached to the arm 18b so that hydraulic actuation of the actuating piston 40 causes the arm 18b to pivot relative to the boom 18a as best seen in FIG. 1. Yet another actuating piston 42 has an upper end pivotally coupled to the arm 18b and a lower end pivotally coupled to a linkage that attaches the feller head 18c to the arm 18b so that hydraulic actuation of the actuating piston 42 causes the feller head 18c to move relative to the arm 18b in a conventional manner, as also seen in FIG. 1. In the illustrated embodiment, the feller head 18c is also hydraulically actuated to grab and cut trees in a conventional manner. Therefore, there are several hydraulic lines 44 extending along the work implement 18, which need to be hydraulically supplied from the vehicle body 16 at the work implement attachment portion 28.

Figure 9:
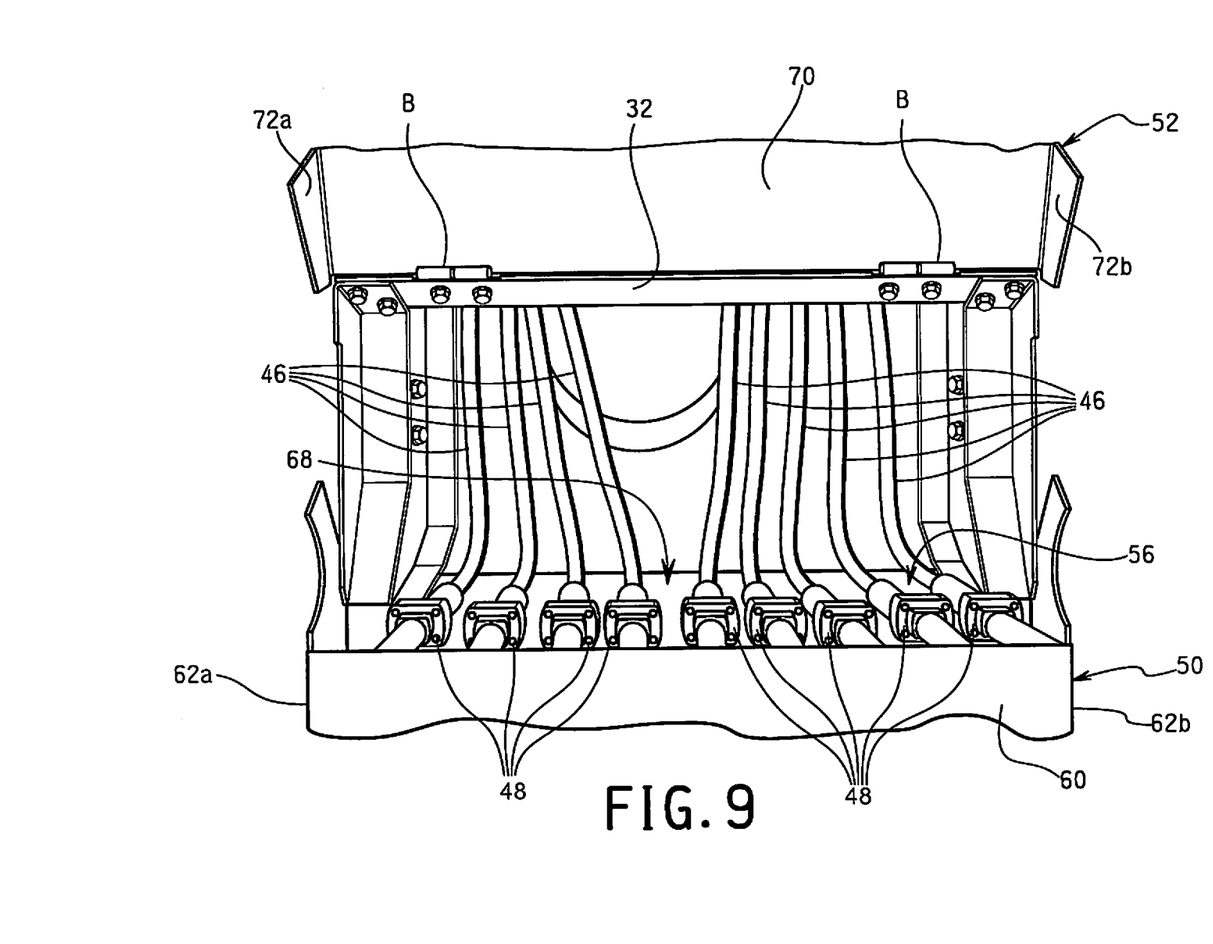
FIG. 9 is an enlarged rear perspective view of the work vehicle illustrated in FIG. 1, with covers moved to expose an access opening usable to access hydraulic components.

In addition, as seen in FIGS. 2 and 9, hydraulic lines 46 extend into an opening at the base of the boom 18a and underneath the sloped panel. The hydraulic lines 46 at the upper end of the sloped panel 30 are attached to couplings 48 of the boom 18a as seen in FIG. 9. The hydraulic lines 44 on the upper side of the boom 18a are also connected to the couplings 48. The hydraulic lines 44 extending along the upper side of the boom 18a are coupled to the feller head 18c and the actuating piston 42 to control operation and attitude of the feller head 18c in a conventional manner, as best understood from FIG. 9. The hydraulic lines 46 extending from under the sloped panel 30 are coupled to the actuating pistons 38a and 38b in a conventional manner.

Referring now to FIGS. 2-9, the cover structure 20 will now be explained in more detail. In the illustrated embodiment, the cover structure 20 basically includes a work implement cover 50, a chassis side cover 52, a top cover 54 and an underside cover 56. The work implement cover 50 can be considered a first cover, the chassis side cover 52 can be considered a second cover, the top cover 54 can be considered a third cover and the underside cover 56 can be considered a fourth cover. However, it will be apparent to those skilled in the art from this disclosure that "first", "second", "third" and "fourth" as used herein can be used interchangeably without departing from the scope of the present invention. The cover structure 20 cooperates with parts of the vehicle body 16 and the work implement 18 to reduce the possibility of debris impacting operation of the work implement as mentioned above. The work implement cover 50 is fixed to the boom 18a to move therewith. The chassis side cover 52 is movable coupled to the vehicle body 16. The top cover 54 is attached to one of the boom 18a and the work implement cover 50. The underside cover 56 is attached to the boom 18a.

As best seen in FIGS. 3-4 and 7-8, in the illustrated embodiment the work implement cover 50 is shaped as a box-shaped enclosure and is formed from several panel members fixedly attached together. The work implement cover 50 is also fixedly attached relative to the boom 18a to move with the boom 18a. In particular, the work implement cover 50 includes a first upper portion 60, a pair of first side portions 62a and 62b, a pair of underside portions 64a and 64b, and a first end portion 66. In the illustrated embodiment, the first upper portion 60, the pair of first side portions 62a and 62b, the pair of underside portions 64a and 64b, and the first end portion 66 are each constructed of rigid metallic material, such as steel. The first upper portion 60 is shorter along the extending direction of the boom 18a than the pair of first side portions 62a and 62b to define an access opening 68 together with the pair of first side portions 62a and 62b, as best seen in FIGS. 5-9. The hydraulic lines 46 and the couplings 48 are accessible within the access opening 68 when the top cover 54 is lifted up and the chassis side cover 52 is moved rearward, as discussed in more detail below and best seen in FIG. 9.

In the illustrated embodiment, the first upper portion 60 is a planar panel having a rectangular shape, while the pair of first side portions 62a and 62b extend at right angles downwardly from the first upper portion 60. The pair of first side portions 62a and 62b are planar but have irregular shapes as best shown in FIGS. 7-8. The first upper portion 60 generally follows the inclination of the boom 18a. The pair of underside portions 64a and 64b extend at right angles to the pair of side portions 62a and 62b. The pair of underside portions 64a and 64b are disposed on opposite lateral sides of the boom 18a and are fixed to the boom 18a as best seen in FIGS. 7-8. The first end portion 66 extends at right angles relative to the first upper portion 60 and the first side portions 62a and 62b. The first end portion 66 is also a planar member but has openings for the hydraulic lines 44 on the upper part of the boom 18a to extend therethrough.

Therefore, the hydraulic piping 44 is disposed on an upper surface of the work implement 18 while the vehicle body 16 is in a level operating position, and the work implement cover 50 covers some of the hydraulic piping 44. More specifically, in the illustrated embodiment, the hydraulic piping 44 is disposed on an upper surface of the boom 18a, and the work implement cover 50 covers a portion of the hydraulic piping 44 extending immediately from the couplings 48. As explained above, the work implement cover 50 is coupled to the work implement 18, and in the illustrated embodiment, the work implement cover 50 is non-movably fixed to the work implement 18 to move therewith about the first pivot axis A. More specifically, in the illustrated embodiment, the work implement cover 50 is non-movably fixed to the boom 18a to move therewith about the first pivot axis A.

Referring now to FIGS. 2-9, in the illustrated embodiment the chassis side cover 52 is shaped as a generally inverted U-shaped member and is formed from several panel members fixedly attached together. The chassis side cover 52 is movably coupled relative to the work implement cover 50 and is movably coupled relative to the vehicle body 16. In the illustrated embodiment, the chassis side cover 52 is hingedly coupled to the vehicle body 16 and is at least partially overlappingly disposed on the work implement cover 50. In the illustrated embodiment, the chassis side cover 52 is pivotally coupled to the vehicle body 16 to pivot about a second pivot axis B offset from the first pivot axis A. In the illustrated embodiment, the first and second pivot axes A and B are non-movably fixed relative to the vehicle body 16. Moreover, the second pivot axis B is located rearward and upward of the first pivot axis A while the vehicle body 16 is in a level operating position as shown in FIG. 1. Of course, it will be apparent to those skilled in the art from this disclosure that during operation, the vehicle body 16 will not always be level. However, for the sake of understanding the positioning of the various elements relative to each other, a level operating position can provide a useful frame of reference.

As mentioned above, the chassis side cover 52 is pivotally coupled relative to the vehicle body 16. The top cover 54 is arranged to apply a downward force on the chassis side cover 52 to maintain the chassis side cover 52 in the positions shown in FIGS. 1-8. However, the top cover 54 can be moved (lifted up, bent) so as not to apply a downward force on the chassis side cover 52. In such a case, the chassis side cover can pivot rearward to expose the hydraulic lines 46 and couplings 48 within the access opening 68, as shown in FIG. 9. Thus, the chassis side cover 52 covers the access opening 68 while in a working position as shown in FIGS. 1-8, and is hingedly movable away from the work implement cover 50 to an access position to allow access to the access opening 68 as shown in FIG. 9.

Referring now to FIGS. 2-6 and 9, the chassis side cover 52 of the illustrated embodiment basically includes a second upper portion 70, a pair of second side portions 72a and 72b, and a second end portion 76 with a cap member 77. In the illustrated embodiment, the second upper portion 70 is a planar panel having a rectangular shape, while the pair of second side portions 72a and 72b extend at right angles downwardly from the second upper portion 70. A lower end of the second upper portion 70 is pivotally attached to the cover attachment section 32 of the work implement attachment portion 28. The pair of second side portions 72a and 72b are planar but have irregular, shapes as best shown in FIG. 2. The second upper portion 70 is inclined relative to the first upper portion 60 due to the positions of the pivot axes A and B. The second end portion 76 extends at right angles relative to the second upper portion 70 and the second side portions 72a and 72b. The second end portion 76 is also a planar member and is disposed at an upper end of the chassis side cover 52.

In the illustrated embodiment, the second upper portion 70, the pair of second side portions 72a and 72b, and the second end portion 76 are each constructed of rigid metallic material, such as steel. The cap member 77 is attached to the second end portion 76. In the illustrated embodiment, the cap member 77 is constructed of a low friction material, such as smooth plastic. The cap member 77 has an elongated rectangular shape as best understood from FIGS. 2-6. The cap member 77 extends downwardly below a lowermost edge of the second end portion 76 so that the cap member 77 contacts and slides on the first upper portion 60 of the work implement cover 50. Thus, the second end plate 76 in the illustrated embodiment does not touch the first upper portion 60. By this arrangement scratching and binding between the first and second upper portions 60 and 70 can be minimized. In addition, an upper end of the cap member 77 is either flush with or extends slightly above the second upper portion 70. Therefore, the top cover 54 contacts and slides on the cap member 77. By this arrangement binding between the second upper portion 70 and the top cover 54 can be minimized. Movement between two positions is illustrated in FIGS. 3-6. In the illustrated embodiment, the second upper portion 70, the pair of second side portions 72a and 72b, and the second end portion 76 are integrally formed together as a one-piece unitary member.

Figure 5:
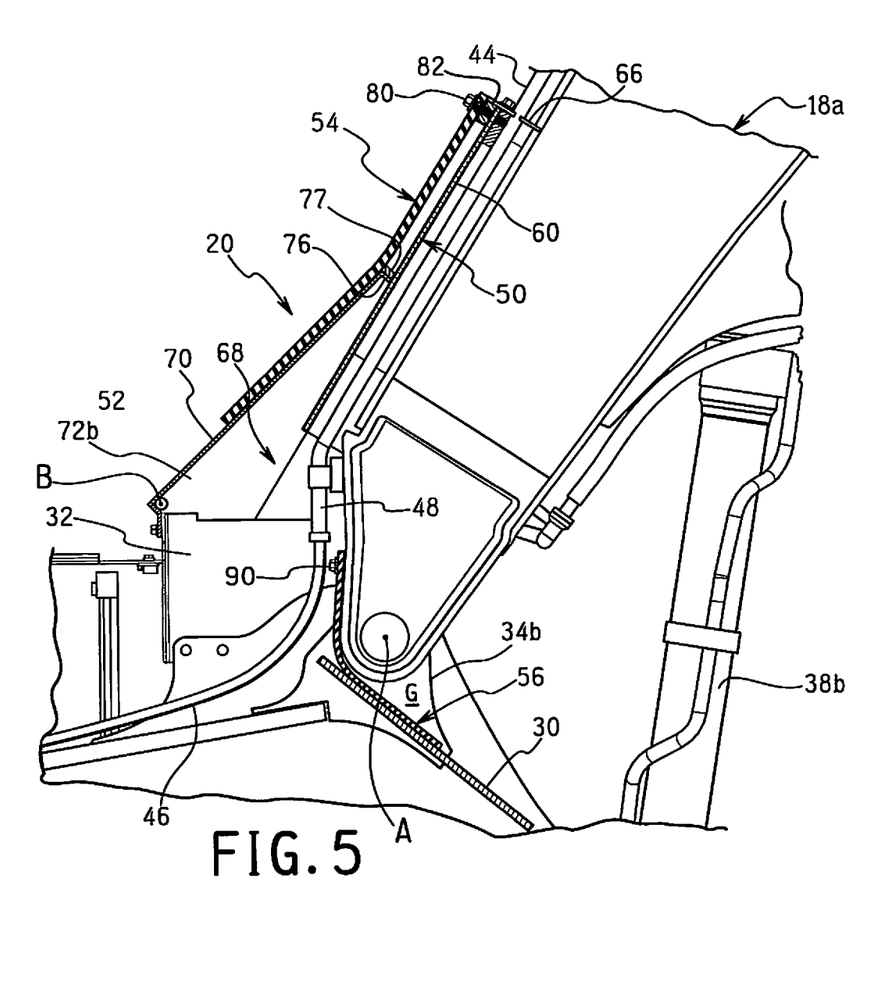
FIG. 5 is an enlarged partial longitudinal cross-sectional view of the work vehicle illustrated in FIG. 1, with the work implement in the first position.
Figure 6:
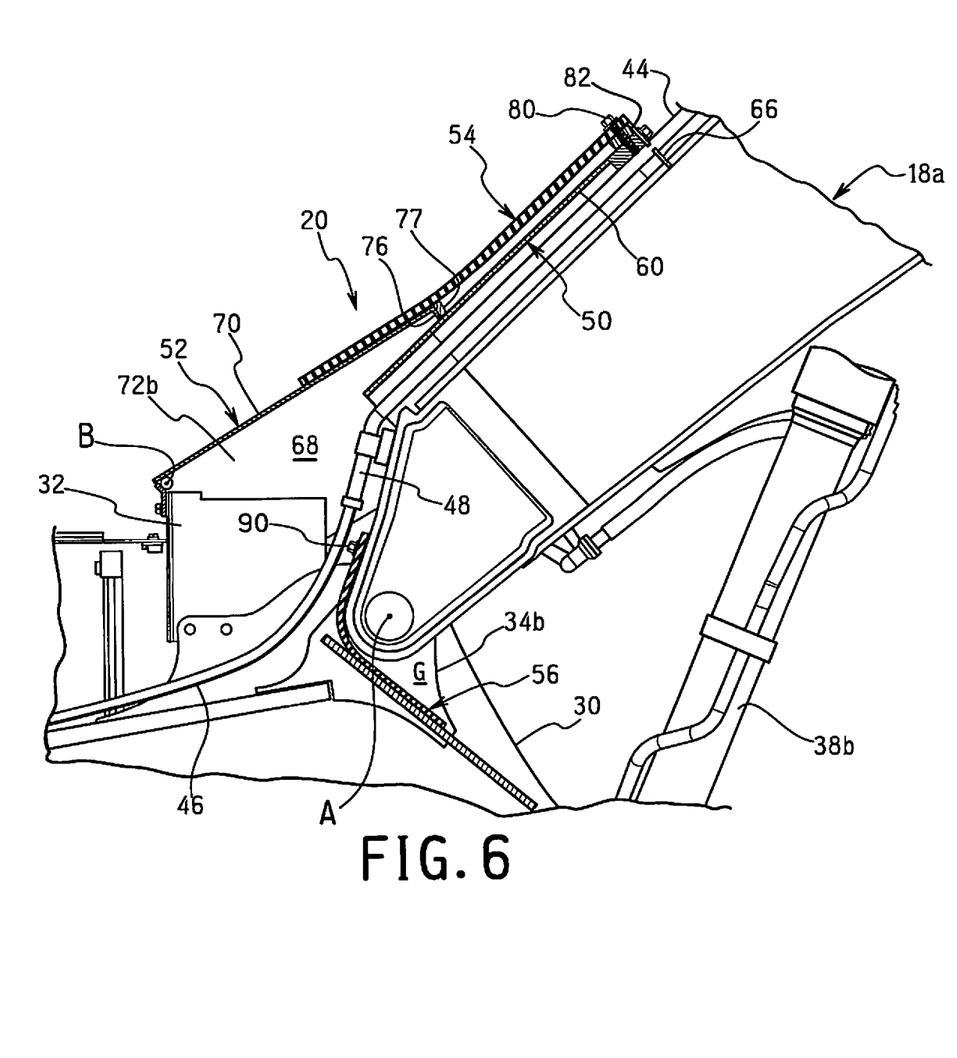
FIG. 6 is an enlarged partial longitudinal cross-sectional view of the work vehicle illustrated in FIG. 1, with the work implement in the second position.

Referring now to FIGS. 3-8, in the illustrated embodiment, the top cover 54 is shaped as a single rectangular plate member. The top cover 54 is fixedly attached to at least one of the work implement cover 50 and the boom 18a of the work implement 18. In the illustrated embodiment, top cover 54 is fixed to an upper end of the first upper portion 60 of the work implement cover 50. More specifically, bolts 80 and an elongated spacer 82 are used to attach the top cover 54 to the work implement cover 50 so that the top cover 54 is attached in a spaced arrangement from the first upper portion 60, as best seen in FIGS. 5-6. In the illustrated embodiment, the top cover 54 is constructed of a flexible material. One example of a suitable flexible material is a rubber belt. However, it will be apparent to those skilled in the art from this disclosure that other flexible materials could be used.

In the illustrated embodiment, the top cover 54 is fixedly attached to the work implement cover 50 and is at least partially overlappingly disposed on the chassis side cover 52 to form a fish scale arrangement. More specifically, in the illustrated embodiment, the top cover 54 has a first end portion that is fixed to the work implement cover 50, and a second end portion overlapping the chassis side cover 52. Thus, the top cover 54 covers a junction between the work implement cover 50 and the chassis side cover 52. However, because the top cover 54 is flexible, the top cover 54 can be lifted and bent so as not to overlap the chassis side cover. When the top cover 54 is in such a position, the chassis side cover can be pivoted rearward to access components within the access opening 68. However, the top cover 54 is relatively large and thick as can be understood from the figures and the typical sizes of work vehicles such as work vehicle 10.

Therefore, when the top cover 54 is overlappingly lying on top of the chassis side cover, the top cover 54 applies a continuous downward pressure such that the chassis side cover 52 is in continuous contact with the work implement cover 50. Thus, the chassis side cover 52 covers the access opening 68 while in a working position as shown in FIGS. 1-8, and is hingedly movable away from the work implement cover 50 when the top cover is lifted to the access position to allow access to the access opening 68 as shown in FIG. 9. Accordingly, at least one hydraulic component is accessible through the access opening 68.

Referring now to FIGS. 5-9, in the illustrated embodiment the underside cover 56 is shaped as a single rectangular plate member. The underside cover 56 is fixedly attached to at least one of the work implement cover 50 and the boom 18a of the work implement 18. In the illustrated embodiment, underside cover 56 is fixed to an upper side of the lower end of the boom 18a of the work implement 18. More specifically, bolts 90 are used to attach the underside cover 56 to the boom 18a, as best seen in FIGS. 5-8. In the illustrated embodiment, the underside cover 56 is constructed of a flexible material. One example of a suitable flexible material is a rubber belt. However, it will be apparent to those skilled in the art from this disclosure that other flexible materials could be used. In the illustrated embodiment, the material of the underside cover 56 is the same as the material of the top cover 54. However, it will be apparent to those skilled in the art from this disclosure that different materials could be used.

In the illustrated embodiment, the underside cover 56 is attached to the boom 18a at a position under the hydraulic lines 46 and couplings 48, as seen in FIGS. 5-9. The underside cover 56 then extends to an opposite side of the boom 18a and lies on the sloped panel 30 to prevent debris from entering the area where the hydraulic lines 46 and couplings 48 are disposed. The normal shape of the underside cover 56 is a flat member. Thus, the curved shape shown in the drawings is an elastically deformed shape, which means that the lower part of the underside cover 56 is biased against the sloped panel 30 to prevent debris from getting underneath the underside cover 56. Therefore, the underside cover 56 together with the work implement attachment portion 28, the work implement cover 50 and the chassis side cover 52 form an enclosure around the work equipment pivot base.

Referring again to FIGS. 2-8, in the illustrated embodiment, the first upper portion 60 of the work implement cover 50 has a first upper shape, and the second upper portion 70 of the chassis side cover 52 has a second upper shape matching the first upper shape. In the illustrated embodiment, the first and second upper shapes are planar, flat shapes. However, it will be apparent to those skilled in the art from this disclosure that other shapes are possible without departing from the scope of this invention. Moreover, in the illustrated embodiment, the sizes of the first and second upper portions 60 and 70 are substantially the same, except that the second upper portion 70 is slightly larger than the first upper portion 60.

As mentioned above, the pair of first side portions 62a and 62b extend downwardly from the first upper portion 60 on opposite sides of the work implement 18. The pair of second side portions 72a and 72b extend downwardly from the second upper portion 70 on opposite sides of the first side portions 62a and 62b, respectively. In the illustrated embodiment, the second upper portion 70 is only slightly larger than the first upper portion 60 such that only a very small gap is formed between the second side portions 72a and 72b and the first side portions 62a and 62b. As also mentioned above, the chassis side cover 52 is slidable relative to the work implement cover 50 when the work implement 18 moves such that the junction between the work implement cover 50 cover and the chassis side cover 52 is also movable. Furthermore, the top cover 54 is slidable relative to the chassis side cover 52 when the work implement 18 moves with respect to the vehicle body 16.

As mentioned above, the underside cover 56 is coupled to at least one of the work implement 18 and the work implement cover 50 to cover a gap G between the work implement 18 and the vehicle body 16. The work implement 18 has the first portion of the boom 18a pivotally coupled to the vehicle body 16, with the gap G being formed between the first end of the boom 18a and the vehicle body 16 as best seen in FIGS. 7-8. The work implement cover 50 and the chassis side cover 52 are disposed on a first (engine/rear) side of the first portion of the boom 18a. The underside cover 56 extends through the gap G, and has first end portion coupled on the first side of the first portion of the boom 18a and a second end portion located on a second side of the first portion of the boom 18a.

Many parts of the work vehicle are conventional components that are well known in the work vehicle field. Since these components are well known in the work vehicle field, these structures will not be discussed or illustrated in detail herein, except as related to the invention set forth in the following claims.

As used herein, the following directional terms "forward, rearward, above, downward, vertical, horizontal, below and transverse" as well as any other similar directional terms refer to those directions of a work vehicle on a level surface. Accordingly, these terms, as utilized to describe the present invention should be interpreted relative to a work vehicle equipped with the present invention. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A work vehicle comprising:
    a vehicle body;
    a work implement movably coupled to the vehicle body, the work implement including a boom having a first end and a second end, and the first end of the boom being pivotally attached to the vehicle body about a first pivot axis;
    at least one hydraulic component arranged on an upper side of the boom;
    a first cover fixed to the boom, the first cover extending longitudinally away from the first end toward the second end of the boom, the first cover including an access opening through which the at least one hydraulic component is accessible; and
    a second cover pivotally attached to the vehicle body to pivot about a second pivot axis relative to the vehicle body, with the second cover at least partially overlappingly disposed on the first cover so as to cover the access opening from above while the second cover is in a working position, the second cover being pivotally movable about the second pivot axis away from the first cover to an access position to allow access to the access opening.

2. The work vehicle according to claim 1, wherein the second cover pivots about the second pivot axis and slides along the first cover when work implement is moved about the first pivot axis while the second cover is in the working position.

3. The work vehicle according to claim 2, wherein the second pivot axis is offset from and non-movable relative to the first pivot axis.

4. The work vehicle according to claim 3, wherein the second pivot axis is located rearward and upward of the first pivot axis while the vehicle body is in a level operating position.

5. The work vehicle according to claim 1, wherein the at least one hydraulic component includes at least one hydraulic line disposed on an upper surface of the work implement,
    the first cover covers the at least one hydraulic line.

6. The work vehicle according to claim 5, wherein the first cover has a first upper portion with a first upper shape, and
    the second cover has a second upper portion with a second upper shape matching the first upper shape.

7. The work vehicle according to claim 6, wherein the first upper shape and the second upper shape are planar.

8. The work vehicle according to claim 6, wherein the first cover has a pair of first side portions extending downwardly from first upper portion on opposite sides of the work implement,
    the second cover has a pair of second side portions extending downwardly from second upper portion on opposite sides of the first side portions.

9. The work vehicle according to claim 1, further comprising
    a third cover coupled to at least one of the boom and the first cover such that the third cover covers a junction between the first cover and the second cover,
    the third cover overlapping the first and second covers so that the second cover is sandwiched between the first and third covers, and such that the third cover slides relative to the second cover when work implement is moved about the first pivot axis.

10. The work vehicle according to claim 9, wherein the third cover is constructed of a flexible material.

11. The work vehicle according to claim 9, wherein the third cover has a first end portion that is fixed to the first cover, and a second end portion overlapping the second cover.

12. The work vehicle according to claim 9, wherein the third cover applies a continuous downward pressure on the second cover.

13. The work vehicle according to claim 9, wherein the second cover is slidable relative to the first cover when the work implement moves such that the junction between the first cover and the second cover is movable.

14. The work vehicle according to claim 1, further comprising
    an underside cover having a first end portion and a second end portion, the first end portion being coupled to at least one of the boom and the first cover, the underside cover extending between the boom and the vehicle body,
    the first end portion moving with the boom when the work implement moves about the first pivot axis, and the second end portion sliding relative to a panel of the vehicle body disposed below the boom when the work implement moves about the first pivot axis.

15. The work vehicle according to claim 14, wherein the underside cover is constructed of a flexible material.

16. The work vehicle according to claim 15, wherein the first end portion of the underside cover is coupled on the upper side of the boom and the second end portion is located underneath the boom.

17. The work vehicle according to claim 1, wherein the work implement includes a feller head.

18. The work vehicle according to claim 1, wherein the first pivot axis and the second pivot axis are fixed relative to the vehicle body.

19. A method of accessibly covering hydraulic components attached to a boom of work vehicle comprising:
    coupling a work implement including a boom to a vehicle body of the work vehicle, such that a first end of the boom is pivotally attached to the vehicle body about a first pivot axis;
    providing at least one hydraulic component arranged on an upper side of the boom;
    providing a first cover that is fixed to the boom and configured to extend longitudinally away from the first end toward a second end of the boom;

providing an access opening in the first cover, the access opening being configured and arranged to enable access to the at least one hydraulic component; and providing a second cover to be pivotally attached to the vehicle body between a working position and an access position about a second pivot axis relative to the vehicle body, the second cover at least partially overlapping the first cover so as to cover the access opening from above while the second cover is in the working position, the second cover being pivoted away from the first cover to allow access to the access opening while the second cover is in the access position.

20. A work vehicle comprising:

a vehicle body;

a work implement movably coupled to the vehicle body, the work implement including a boom having a first end and a second end, the first end of the boom being pivotally attached to the vehicle body about a first pivot axis;

at least one hydraulic component arranged on an upper side of the boom;

an underside cover configured and arranged to cover a gap between the first end of the boom and the vehicle body from underneath, the underside cover having a first end portion that is fixed to at least one of the boom and the first cover, and a second end opposite the first end, the underside cover extending underneath the boom to be disposed between the boom and a sloped panel of the vehicle body, a middle portion of the underside cover between the first end and the second end being elastically curved such that the second end portion is biased against the sloped panel.

* * * * *